United States Patent

Padwa et al.

[11] Patent Number: 5,910,538
[45] Date of Patent: Jun. 8, 1999

[54] COMPATIBILIZED ABS POLYCARBONATE MOLDING

[75] Inventors: Allen R. Padwa, Worcester; Venkatarayaloo Janarthanan, Holyoke, both of Mass.

[73] Assignee: Bayer Corporation, Pittsburgh, Pa.

[21] Appl. No.: 09/066,490

[22] Filed: Apr. 24, 1998

[51] Int. Cl.[6] .................................................. C08L 51/00
[52] U.S. Cl. ................................. 525/67; 525/71; 525/73; 525/74; 525/78; 525/80; 525/84
[58] Field of Search .................................. 525/67, 71, 73, 525/74, 78, 80, 84

[56] References Cited

U.S. PATENT DOCUMENTS 4,713,415  12/1987  Lavengood et al. ...................... 525/66
5,420,181  5/1995  Eichenauer et al. ...................... 524/91
5,672,645  9/1997  Eckel et al. ............................. 524/127
5,674,924  10/1997  Lee et al. ............................... 523/201

*Primary Examiner*—Mark L. Warzel
*Attorney, Agent, or Firm*—Joseph C. Gil; Aron Preis

[57] ABSTRACT

A thermoplastic molding composition containing a blend of polycarbonate, vinyl copolymer, such as SAN, and a graft polymer, such as ABS is disclosed. The invention resides in the finding that the incorporation of a compatibilizing agent which comprises a polymeric resin having a number average molecular weight of at least about 21,000 and which is miscible with the grafted phase of the graft polymer and which contains secondary amine reactive groups in its structure yields stable compositions having improved mechanical properties especially at low temperatures.

10 Claims, No Drawings

COMPATIBILIZED ABS POLYCARBONATE MOLDING

BACKGROUND OF THE INVENTION

This invention relates to thermoplastic molding composition and particularly to compositions containing a compatibilized blend of an aromatic polycarbonate resin and a graft copolymer. The composition is useful in making molded articles having improved energy absorption at low temperatures.

Thermoplastic molding compositions containing polycarbonates (PC) and ABS polymers have been known for some time. Such compositions which find use in a variety of applications are available commercially, for instance, from Bayer Corporation under the Bayblend trademark. Also, the art is noted to include a large number of relevant patents, including U.S. Pat. No. 5,420,181 which disclosed stabilized PC/ABS system, and U.S. Pat. Nos. 5,672,645 and 5,674,924 which disclosed flame resistant PC/ABS molding compositions. However, the energy absorption at low temperatures characterizing these compositions is recognized to be inadequate for some applications. While it is possible to increase the energy absorbing characteristics of the composition by adding rubber, this often results in decreased modulus. It has now been found that the incorporation of a particular compatibilizer in the polycarbonate/ABS blend improves its energy absorption characteristics without the addition of more rubber. U.S. Pat. No. 4,713,415 which disclosed a compatibilizing agent for a polymeric system containing nylon and ABS is relevant in the present context.

The present invention concerns a thermoplastic molding composition comprising:

A) 20 to 90 parts by weight (pbw) of an aromatic polycarbonate resin,

B) 4.5 to 70 pbw of a vinyl copolymer,

C) 5 to 70 pbw of a graft polymer, and

D) 0.5 to 5 pbw of a compatibilizer.

Articles molded from the inventive composition are characterized in their improved capacity to absorb energy at low temperature.

DETAILED DESCRIPTION OF THE INVENTION

The thermoplastic molding composition of the present invention comprises:

A) 20 to 90 pbw, preferably 30 to 80 pbw and, more preferably, 40 to 70 pbw of an aromatic polycarbonate, B) 4.5 to 70 pbw, preferably 5 to 60 pbw and, more preferably, 10 to 50 pbw of a vinyl copolymer of B.1) 50 to 99 percent relative to the weight of the copolymer of at least one member selected from the group consisting of styrene, alpha-methyl styrene, nucleus-substituted styrene, $C_{1-8}$-alkyl methacrylate and $C_{1-8}$-alkyl acrylate and B.2) 1 to 50 percent relative to the weight of the copolymer of at least one member selected from the group consisting of acrylonitrile, methacylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide, C) 5 to 70 pbw, preferably 10 to 60 pbw and, more preferably, 20 to 50 pbw of a graft polymer containing C.1) 5 to 95 percent, preferably 30 to 80 percent, relative to the weight of the graft polymer of a grafted phase, and C.2) 5 to 95 percent, preferably 30 to 80 percent, relative to the weight of the graft polymer of a graft base, wherein said grafted phase contains a polymerized mixture of C.1.1) 50 to 99 percent, relative to the weight of said mixture, of at least one member selected from the group consisting of styrene, alpha-methyl styrene, nucleus-substituted styrene, $C_{1-8}$-alkyl methacrylate and $C_{1-8}$-alkyl acrylate and C.1.2) 1 to 50 percent, relative to the weight of said mixture, of at least one polar monomer selected from the group consisting of acrylonitrile, methacrylonitrile, $C_{1-8}$-alkyl methacrylate, $C_{1-4}$-alkyl acrylate, maleic anhydride, $C_{1-4}$-alkyl-N-substituted maleic imide and $C_{1-4}$-phenyl-N-substituted maleic imide, and wherein said graft base includes C.2) a crosslinked elastomer in particulate form having an average particle diameter ($d_{50}$ value) of 0.05 to 5, preferably 0.1 to 0.6, micron and a glass transition temperature lower than 10° C., preferably lower than −10° C., the sum of the pbw of A, B and C being 100 pbw, and D) 0.5 to 5 parts by weight per one hundred parts of the total A, B and C, herein phr, of a compatibilizing agent which contains 0.05 to 4 mole percent, relative to the moles of monomers making up the compatibilizer, of secondary amine functional groups.

Aromatic polycarbonates within the scope of the present invention are homopolycarbonates and copolycarbonates and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", lnterscience Publishers, New York, N.Y., 1964, all incorporated herein by reference).

In the present context, dihydroxy compounds suitable for the preparation of the polycarbonates of the invention conform to the structural formulae (1) or (2).

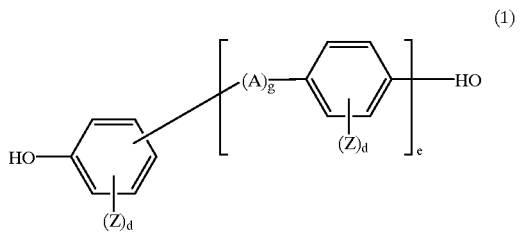

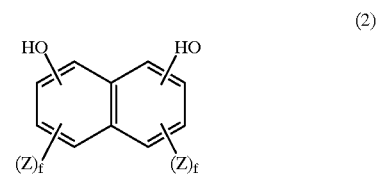

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

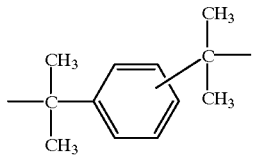

e and g both denote the number 0 to 1; Z denotes F, Cl, Br or $C_1$–$C_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphienyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)4-methylphenol; 2,4-dihydroxybenzoic acid; 2-(4-hydroxylphenyl)-2-(2,4-dihydroxyphenyl)-propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as are disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,1119; 3,729,447; 4,255,556; 4,260,731; 4,369,303 and 4,714,746, all of which are incorporated by reference herein.

The rubber-free, thermoplastic vinyl copolymer, Component B, of the present invention, contains B.1) 50 to 99 percent relative to the weight of the copolymer of at least one member selected from the group consisting of styrene, alpha-methyl styrene, nucleus-substituted styrene, $C_{1-8}$-alkyl methacrylate and $C_{1-8}$-alkyl acrylate and B.2) 1 to 50 percent relative to the weight of the copolymer of at least one member selected from the group consisting of acrylonitrile, methacrylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide.

The molecular weight (weight average, as determined by gel permeation chromatography) of the copolymer of Component B is in the range of 15,000 to 200,000.

Particularly preferred ratios by weight of the components making up the copolymer B are 60 to 95 percent of B.1 and 40 to 5 percent of B.2. Particularly preferred copolymers B include those of styrene with acrylonitrile, optionally with methyl methacrylate; copolymers of alpha-methyl styrene with acrylonitrile, optionally with methyl methacrylate and copolymers of styrene and alpha-methyl styrene with acrylonitrile, optionally with methyl methacrylate.

The styrene/acrylonitrile copolymers of Component B are known and the methods for their preparation by radical polymerization, more particularly by emulsion, suspension, solution and bulk polymerization, are also well documented in the literature.

Component C according to the invention, a graft polymer having rubber-elastic properties, is well known in the art and is commercially available. A general description of such graft polymers is included in "Methoden der Organischen Chemie" (Houben Weyl), Vol. 14/1, Georg Thieme Verlag, Stuttgart 1961, pages 393–406 and in C. B. Bucknall, "Toughened Plastics", Appl. Science Publishers, London 1977, incorporated herein by reference. The graft polymer, incorporated as 5 to 70 pbw, preferably 10 to 60 pbw and, more preferably, 20 to 50 pbw relative to the total A, B and C, contains C.1) 5 to 95 percent, preferably 30 to 80 percent, relative to the weight of the graft polymer of a grafted phase, and C.2) 5 to 95 percent, preferably 30 to 80 percent, relative to the weight of the graft polymer of a graft base, wherein said grafted phase contains a polymerized mixture of C.1.1) 50 to 99 percent, relative to the weight of said mixture, of at least one member selected from the group consisting of styrene, alpha-methyl styrene, nucleus-substituted styrene, $C_{1-8}$-alkyl methacrylate and $C_{1-8}$-alkyl acrylate and C.1.2) 1 to 50 percent, relative to the weight of said mixture, of at least one member selected from the group consisting of acrylonitrile, methacrylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide, and wherein said graft base includes C.2) at least one crosslinked elastomer selected from the group consisting of diene and alkylacrylate in particulate form having an average particle diameter ($d_{50}$ value) of 0.05 to 5, preferably 0.1 to 0.6, micron and a glass transition temperature lower than 10° C., preferably lower than −10° C.

Suitable graft polymers have been disclosed in U.S. Pat. Nos. 3,564,077; 3,644,574 and 3,919,353 which are incorporated herein by reference.

Particularly preferred graft polymers C are obtainable by grafting of at least one (meth) acrylate and/or acrylonitrile and/or styrene as the grafted phase onto a graft base containing butadiene polymer having a gel content of at least 70% by weight (as measured in toluene), the degree of grafting (that is, the ratio between the weight of graft monomers grafted on to the graft base and the weight of the graft base) being between 0.15 and 0.75. In addition to butadiene units, the graft base may contain up to 50% by weight, based on the weight of the butadiene units, of other ethylenically unsaturated monomers, such as styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and/or vinyl ethers. The preferred graft base contains polybutadiene or is a copolymer of polybutadiene/acrylonitrile or a copolymer of polybutadiene/styrene.

Since the graft monomers do not have to be completely grafted onto the graft base in the grafting reaction, graft polymers C in the context of the invention are also understood to include products which are obtained by polymerization of the graft monomers in the presence of the graft base.

The average particle size ($d_{50}$) is the diameter above which 50% by weight of the particles and below which 50% by weight of the particles lie. It may be determined by ultracentrifuge measurement (W. Scholtan, H. Lange, Kolloid Z. und Z. Polymere 250 (1972), 782–796).

Other particularly preferred polymers useful as the graft base include acrylate rubber having a glass transition temperature below −20° C., as the graft base. These include alkyl acrylates, optionally with up to 40% by weight of other polymerizable, ethylenically unsaturated monomers. Most preferred polymerizable acrylic acid esters include $C_{1-8}$-alkyl esters, for example methyl, ethyl, butyl, n-octyl and 2-ethylhexyl ester and haloalkyl esters, and mixtures of these monomers. Preferred "other" polymerizable, ethylenically unsaturated monomers which may optionally be used in addition to the acrylates for the production of the graft base include, for example, acrylonitrile, styrene, alpha-methyl styrene, acrylamides, vinyl $C_{1-6}$-alkyl ethers, methyl methacrylate and butadiene.

Other suitable graft bases are silicone rubbers containing graft-active sites of the type described in DE-OS 3 704 657, DE-OS 3 704 655, DE-OS 3 631 540 and DE-OS 3 631 539.

For attaining crosslinking, monomers containing more than one polymerizable double bond are copolymerized according to known procedures. Examples of crosslinking monomers are esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, for example ethylene glycol dimethylacrylate, allyl methacrylate; polyunsaturated heterocyclic compounds, such as for example trivinyl and triallyl cyanurate; polyfunctional vinyl compounds, such as di- and trivinyl benzenes; and also triallyl phosphate and diallyl phthalate. Preferred crosslinking monomers are allyl methacrylate, ethylene glycol dimethacrylate, diallyl phthalate and heterocyclic compounds containing at least three ethylenically unsaturated groups. Particularly preferred crosslinking monomers are the cyclic monomers triallyl cyanurate, triallyl isocyanurate, trivinyl cyanurate, triacryloyl hexahydro-s-triazine, triallyl benzenes.

The crosslinking monomers are incorporated preferably at a level of 0.02 to 5 percent, preferably 0.05 to 2 percent, based on the weight of the graft base. In the case of cyclic crosslinking monomers containing at least three ethylenically unsaturated groups, it is of advantage to limit the quantity to below 1% by weight of the graft base.

The gel content of the graft base may be determined in dimethyl formamide at 25° C. (M. Hoffmann, H. Kromer, R. Kuhn, Polymeranalytik I und II, Georg Thieme-Verlag, Stuttgart 1977).

The graft polymers may be produced by known methods, such as bulk, suspension, emulsion or bulk suspension polymerization.

Preferred polymers are crosslinked and have gel contents of more than 20% by weight, preferably more than 40% by weight and, more preferably, more than 60% by weight.

The compatibilizing agent, Component D, is a polymeric resin having a number average molecular weight (measured by gel permeation chromatography) of at least about 21,000 and preferably at least about 30,000 and a weight average molecular weight of at least about 40,000 and preferably at least about 60,000, miscible with the grafted phase of the grafted rubber (Component C) and containing about 0.05 to 4.0 mole percent of secondary amine reactive groups. The secondary amine reactive groups of the compatibilizing agent react under the time and temperature conditions prevailing in the course of its melt blending with the Components A, B, and C, with the carbonate groups of Component A. Determining the miscibility of component D in the grafted phase is preferably carried out by measurements of the relevant glass transition temperatures.

An example of the compatibilizer, Component D, is an amine-functional copolymer of (a) and (b) where (a) is a vinylaromatic monomer selected from the group consisting of styrene, alpha-methyl styrene, nucleus-substituted styrene, $C_{1-8}$-alkyl methacrylate and $C_{1-8}$-alkyl acrylate and where (b) at least one member selected from the group consisting of acrylonitrile, methacrylonitrile, $C_{1-4}$-alkyl methacrylate, $C_{1-4}$-alkyl acrylate in a weight ratio of (a) to (b) in the range of 85:15 to 15:85.

The vinylaromatic polymer may be functionalized by polymerizing the vinylaromatic monomer with monomers (a) and/or (b) with minor amount of monomer containing a carboxylic acid such as acrylic or methacrylic acid or $C_{1-2}$-monoalkyl esters of diacids such as monomethyl maleate and mono-dodecyl fumarate, a dicarboxylic acid such as fumaric acid, maleic acid, itaconic acid, aconitic acid or citraconic acid, an anhydride, such as maleic, itaconic, aconitic or citraconic anhydride, or other monomers containing similar functional groups. Critically, the functional group is then converted to a secondary amine. The preparation of a compound suitable as a compatibilizer has been disclosed in co-pending U.S. patent application Ser. No. 08/992,729 filed Dec. 17, 1997. The preparation of a suitable compatibilizer is disclosed in the experimental section below.

The preferred Component D is a terpolymer containing styrene, alpha-methylstyrene or p-methylstyrene, acrylonitrile and from about 0.05 to about 4.0 mole percent amine functionality. A more preferred Component D is a styrene-acrylonitrile-maleic anhydride terpolymer containing from about 0.3 to about 9.5 mole percent maleic anhydride and the most preferred contains about I mole percent maleic anhydride. The styrene monomer:acrylonitrile weight ratio in Component D is in the range of 85:15 to 15:85 and is preferably in the range of 80:20 to 50:50. Preferably, the same styrene monomer is selected for the graft of component C and the compatibilizer, Component D. With such a terpolymer, miscibility with the grafted phase of the graft polymer, Component C, is obtained when the graft polymer and the compatibilizer both contain styrene and acrylonitrile and the weight percentage of the styrene monomer in the graft copolymer differs from the weight percentage of styrene monomer in Component D by no more than +/−5 percent.

The preferred amount of Component D in the polyblend is in the range of 0.5 to 5 percent relative to the total weight of A, B and C. A more preferred amount of Component D in the polyblend is 2 to 3 weight percent.

In addition to the above components, the composition of the invention may advantageously contain conventional additives such as plasticizers, antioxidants, stabilizers, flame-retardants, fibers, mineral fibers, mineral fillers, dyes, pigments and the like in conventional, functional amounts.

The inventive composition was found useful for the preparation of thermoplastically molded articles, including injection molded and extruded articles.

The components of the polyblend can be melt blended by any of the known customary and convenient processes. Usually, however, the components are blended in a high intensity blender such as a Banbury Mixer or twin-screw extruder.

The invention is described below with reference to the specific examples which are for the purposes of illustration only and are not intended to imply any limitation on the scope of the invention.

COMPONENTS USED

The polycarbonate used was a linear aromatic polycarbonate resin based on Bisphenol A having a melt index of 4.5 grams per 10 minutes at 300° C. with 1.2 kg load.

ABS refers to an emulsion graft containing polymerized styrene and acrylonitrile in a weight ratio of 70:30 in the presence of polybutadiene/acrylonitrile (93/7 by weight) rubber. It contained 40 percent by weight rubber. The weight average molecular weight of the un-grafted SAN copolymer fraction (determined by gel permeation chromatography—GPC) is about 150,000. ASTM Method D-3536-76 is used in GPC, modified in that four columns in series using micro Styragel.™. (A trademark of Waters Assoc.) packing are used with a nominal exclusion limit of 5,000 nm, 10,000 nm, 100,000 nm and 1,000,000 nm. The detector is an ultraviolet light detector set at wavelength 254 nm. The test samples are prepared at a concentration of 0.25 weight percent of polymer in tetrahydrofuran. The sample injection size is 0.2 ml and a flow rate of 2 ml/min. at ambient temperature is used. The grafted rubber has a weight average particle size ($d_{50}$) of about 0.2 micron, measured by Photon Correlation Spectroscopy using a Brookhaven Instrument Company BI-90 Particle Sizer.

The ABS polymer is recovered from the emulsion by conventional coagulation, filtration and washing.

SAN refers to a copolymer of styrene and acrylonitrile made by continuous bulk polymerization. The copolymer contains 67.2 weight % styrene and 32.5 weight % acrylonitrile. The number and weight average molecular weights, as measured by GPC, are 51,000 and 107,000, respectively.

Compatibilizer refers to a terpolymer and is prepared as follows:

A mixture of 49.8 parts styrene, 29.1 parts acrylonitrile, 0.8 parts maleic anhydride, 20 parts methylethyl ketone, 0.105 parts t-butyl-2-ethyl-hexyl peroxycarbonate (peroxide initiator) and 0.25 parts isooctyl thioglycolate (chain transfer agent) were fed to a continuously stirring reactor operating at 145° C. at a rate necessary to give a 45 minute residence time. The level of solids in the reactor of about 45% is achieved at steady state and the polymer solution is continuously devolatilized to yield a precursor polymer having styrene:acrylonitrile:maleic anhydride in a weight ratio of 66.5:32.5:1.0. The weight average molecular weight is about 119,000, measured by GPC and intrinsic viscosity (MEK, 25° C.) of 0.45 dl/g. The precursor polymer was then fed to a 34 mm Leistritz co-rotating twin screw extruder fitted with an injection port, a vacuum vent devolatilization zone, and a die face peiletizer. The extruder was operated at 150 RPM and 260° C. with a vacuum of 5 to 50 mm Hg. The precursor was fed at a rate of 9.1 kg/hr. The difunctional amine, 1-(2-aminoethyl)-piperazine, was pumped to the injection port at rates from about 1.25 to 2.0 moles per mole of anhydride or 2.5 to 4.0 ml/min.

In each of the examples and the control example, 1.0% of a lubricant, 0.2% of an antioxidant and 0.2% of citric acid (the percents based on the total weight of the composition) were addled. None of these are believed to have criticality in the present context.

The components were physically blended by an extrusion process. This involves a pre-blending step of physically mixing the ABS, SAN, polycarbonate, terpolymer and antioxidant and feeding the mixture into a 34 mm Leistritz twin-screw extruder (L:D=24:1 screw) at about 250 revolutions per minute at 260°C. The extruder is connected to a die also maintained at 260° C. The extruded material is passed through a water bath and pelletized. The rate of extrusion is 20 kgs per hour.

The pelletized blended material is then injection molded into specimens for testing according to the procedures as set forth above with the testing results concurrently listed for each example in Table 1. The injection molding is conducted using an Engel 225 molding machine, possessing a general purpose screw with a check ring and a straight through nozzle. The minimum injection pressure required to fill the mold is measured as a means of assessing the melt viscosity of the composition.

Multi-axial impact strength was measured on a Fractovis manufactured by CEAST according to ASTM 3763. The energy to maximum (E(max)) is the energy needed to achieve the yielding of the sample. The energy to failure (E(fail)) represents the energy necessary to cause a failure of a sample. The samples are conditioned at room temperature and at −30° C. to determine the effect of temperature on the performance of the polymer.

Examples 1 to 6 and Control 1, shown in Table 1, illustrate the effect of varying the amount of compatibilizer in the polymer blend. At room temperature, no effect of the compatibilizer on energy absorption is noted. However, at −30° C., improved energy absorption is observed, with the maximum improvement noted at about 3% of compatibilizer.

TABLE 1

|  | Control | 1 | 2 | 3 | 4 | 5 | 6 |
|---|---|---|---|---|---|---|---|
| ABS | 25 | 25 | 25 | 25 | 25 | 25 | 25 |
| SAN | 25 | 24.5 | 24 | 23 | 22 | 21 | 20 |
| Polycarbonate | 50 | 50 | 50 | 50 | 50 | 50 | 50 |
| Compatibilizer | 0 | 0.5 | 1 | 2 | 3 | 4 | 5 |
| Stock Temp, ° C. | 265 | 265 | 265 | 265 | 265 | 265 | 265 |
| Mold Temp, ° C. | 77 | 77 | 77 | 77 | 77 | 77 | 77 |
| Molding pressure, PSI | 624 | 600 | 609 | 624 | 638 | 653 | 667 |
| Emax, 23° C. | 38.5 | 39.3 | 37.8 | 38.8 | 37.6 | 35.8 | 34.1 |
| Efail, 23° C. | 43.9 | 44.4 | 43.3 | 43.5 | 43.9 | 43.1 | 41.2 |
| Emax, −30° C. | 36.7 | 41.8 | 40.7 | 41.9 | 43.9 | 39.5 | 40.1 |
| Efail, −30° C. | 41.6 | 43.8 | 43.8 | 43.6 | 46.1 | 42.2 | 42.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) 20 to 90 parts by weight of an aromatic polycarbonate,
   B) 4.5 to 70 parts by weight of a vinyl copolymer of
      B.1) 50 to 99 percent relative to the weight of the copolymer of at least one member selected from the group consisting of styrene, alpha-methyl styrene, nucleus-substituted styrene, $C_{1-8}$-alkyl methacrylate and $C_{1-8}$-alkyl acrylate and
      B.2) 1 to 50 percent relative to the weight of the copolymer of at least one member selected from the group consisting of acrylonitrile, methacrylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide,
   C) 5 to 70 parts by weight of a graft polymer containing
      C.1) 5 to 95 percent relative to the weight of the graft polymer of a grafted phase, and
      C.2) 5 to 95 percent relative to the weight of the graft polymer of a graft base,
   wherein said grafted phase contains a polymerized mixture of
         C.1.1) 50 to 99 percent, relative to the weight of said mixture, of at least one member selected from the group consisting of styrene, alpha-methyl styrene, nucleus-substituted styrene, $C_{1-8}$-alkyl methacrylate and $C_{1-8}$-alkyl acrylate and
         C.1.2) 1 to 50 percent, relative to the weight of said mixture, of at least one polar monomer selected from the group consisting of acrylonitrile, methacrylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide, and
   wherein said graft base comprises
      C.2) a crosslinked elastomer in particulate form having an average particle diameter ($d_{50}$ value) of 0.05 to 5 micron and a glass transition temperature lower than 10° C.
   the sum of the pbw of A, B and C being 100 parts by weight, and
   D) 0.5 to 5 parts by weight per one hundred parts of the total A, B and C of a compatibilizing agent comprising a polymeric resin having a number average molecular weight of at least about 21,000, miscible with said grafted phase and containing about 0.05 to 4.0 mole percent, relative to the compatibilizer, of secondary amine reactive groups.

2. The thermoplastic molding composition of claim 1 wherein said A is present in an amount of 30 to 80 parts by weight.

3. The thermoplastic molding composition of claim 1 wherein said B is present in an amount of 5 to 60 parts by weight.

4. The thermoplastic molding composition of claim 1 wherein said C is present in an amount of 10 to 60 parts by weight.

5. The thermoplastic molding composition of claim 1 wherein said C.2 comprises butadiene units.

6. The thermoplastic molding composition of claim 5 wherein said C.2 contains up to 50% by weight, based on the weight of said butadiene units at least one unit selected from the group consisting of styrene, acrylonitrile, esters of acrylic or methacrylic acid containing 1 to 4 carbon atoms in the alcohol component, vinyl esters and vinyl ethers.

7. The thermoplastic molding composition of claim 1 wherein said C.2 is at least one unit selected from the group consisting of polybutadiene, a copolymer of polybutadiene/acrylonitrile and a copolymer of polybutadiene/styrene.

8. The thermoplastic molding composition of claim 1 wherein said compatibilizing agent comprises a copolymer of styrene and acrylonitrile.

9. A thermoplastic molding composition comprising
   A) 30 to 80 parts by weight of an aromatic polycarbonate,
   B) 5 to 60 parts by weight of a vinyl copolymer of
      B.1) 50 to 99 percent relative to the weight of the copolymer of at least one member selected from the group consisting of styrene, alpha-methyl styrene, nucleus-substituted styrene, $C_{1-8}$-alkyl methacrylate and $C_{1-8}$-alkyl acrylate and
      B.2) 1 to 50 percent relative to the weight of the copolymer of at least one member selected from the group consisting of acrylonitrile, methacrylonitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide,
   C) 10 to 60 parts by weight of a graft polymer containing
      C.1) 5 to 95 percent relative to the weight of the graft polymer of a grafted phase, and
      C.2) 50 to 95 percent relative to the weight of the graft polymer of a graft base, wherein said grafted phase contains a polymerized mixture of C.1.1) 50 to 99 percent, relative to the weight of said mixture, of at least one member selected from the group consisting of styrene, alpha-methyl styrene, nucleus-substituted styrene, $C_{1-8}$-alkyl methacrylate and $C_{1-8}$-alkyl acrylate and C.1.2) 1 to 50 percent, relative to the weight of said mixture, of at least one polar monomer selected from the group consisting of acrylonitrile, methacryl)nitrile, $C_{1-8}$-alkyl methacrylate, $C_{1-8}$-alkyl acrylate, maleic anhydride, $C_{1-4}$-alkyl-N-substituted maleic imide and $C_{1-4}$-phenyl-N-substituted maleic imide, and wherein said graft base includes C.2) a crosslinked polybutadiene elastomer in particulate form having an average particle diameter ($d_{50}$ value) of 0.05 to 5 micron, the sum of the pbw of A, B and C being 100 pbw, and D) 0.5 to 5 parts by weight per one hundred parts of the total A, B and C, herein phr, of a copolymer of styrene and acrylonitrile which contains 0.05 to 4 mole percent, relative to the moles of said copolymer, of secondary amine functional groups.

10. The thermoplastic molding composition of claim 9 wherein said D is present in an amount of 2 to 3 weight percent.

* * * * *